No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 1.

Fig.1.

No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 2.

Witnesses: Thomas M. Smith. Jas. C. Wobensmith.

Inventor: Jean Baptiste Vernay
By J. Walter Douglas,
Attorney.

No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 4.

No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 5.

No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 9.

No. 610,931. Patented Sept. 20, 1898.
J. B. VERNAY.
MACHINE FOR MANUFACTURING BOTTLES, &c.
(Application filed Dec. 27, 1897.)
(No Model.) 10 Sheets—Sheet 10.

UNITED STATES PATENT OFFICE.

JEAN BAPTISTE VERNAY, OF PARIS, FRANCE.

MACHINE FOR MANUFACTURING BOTTLES, &c.

SPECIFICATION forming part of Letters Patent No. 610,931, dated September 20, 1898.

Application filed December 27, 1897. Serial No. 663,664. (No model.) Patented in France February 5, 1897, No. 263,769, and in England September 4, 1897, No. 20,388.

*To all whom it may concern:*

Be it known that I, JEAN BAPTISTE VERNAY, a citizen of the Republic of France, residing at Paris, France, have invented certain new and useful Improvements in Machines for the Manufacture of Bottles and Similar Articles, (for which I have obtained British Letters Patent No. 20,388, dated September 4, 1897, and French Letters Patent No. 263,769, dated February 5, 1897,) of which the following is a specification.

My invention has relation to an automatic machine for the manufacture of bottles and other similar glass articles, and in such connection it relates more particularly to the construction and arrangement of such a machine.

My invention consists of a machine for the manufacture of glass bottles and the like wherein is assembled a frame carrying a fixed table, upon which rotates a central plate provided with a casting-mold, a mold to form the head, a parison-mold, and a finishing-mold. This table also carries the following instrumentalities, namely: the tongs for holding the bottle while being made; the apparatus for blowing; the pouring-funnel and the conveyer for taking the bottles to the annealing-furnace; the arrangement for substituting one mold for another; the arrangement for inverting the casting-mold; the arrangement for the alternate rotation of the plate; the arrangement for turning the tongs; the arrangement for raising and lowering the blowing-tube; the arrangement for rotating the heading-mold, the bottom of the finishing-mold, and the central rod which forms the neck of the bottle; the arrangement for alternately raising the heading-mold, the parison-mold, and the bottom of the finishing-mold, and an arrangement for raising and lowering the central rod forming the neck and pushing the punch which forms the bottom of the bottle.

The nature and scope of my invention will be more fully understood from the following description, taken in connection with the accompanying drawings, forming part thereof, in which—

Fig. 9 is a section on the line 9 9 of Fig. 7. These figures are all drawn to a scale of one-tenth of the true size of the parts represented, whereas Figs. 10 to 18 are detail views of the principal parts of the machine drawn to a scale of one-fifth for Figs. 10 to 17 and one-tenth for Fig. 18.

Referring to the drawings, A represents the framing of the machine. Upon the framing is mounted a fixed table B, provided with a supporting-arch $b$ and a groove $b'$. Upon this table B rests a plate C, to which an alternate rotary movement is given in the manner hereinafter described. The plate C is placed in the center of the machine and is guided underneath by the support $b$ and rotates in the V-shaped groove $b'$. Two lateral axes $c$ and $c'$, placed at equal distances from the center of the plate C, rotate in two sockets $c^2$ and $c^3$, preferably cast integral with the plate. The mold-supporting pillars $c^4$ and $c^5$ are keyed upon the axes $c$ and $c'$. The pillars $c^4$ and $c^5$ are provided at their bases with flanges $c^6$ and $c^7$. The flange $c^6$ carries three similar parts $c^8$, $c^9$, and $c^{10}$, provided with teeth which successively engage with a centering-finger $c^{11}$, carried by the plate C. The flange $c^7$ is provided with three parts $c^{12}$, $c^{13}$, and $c^{14}$ similar to those carried by the flange $c^6$. These pieces successively engage with a centering-finger (not shown in the drawings) opposite to the finger $c^{11}$. The plate C carries two springs $c^{15}$ and $c^{16}$, and these springs impinge at the end of each alternate rotation of the plate C upon abutments $c^{17}$ and $c^{18}$, fixed to supports mounted underneath the table B. The pillar $c^4$ carries one half, $d$, of the casting-mold D. The other half, $d'$, of this mold is carried by the pillar $c^5$.

$d^2$ is the axis of the half $d$ of the mold D, and $d^3$ is the axis of the other half. A buffer-spring $d^4$ is fixed upon the half $d$ of the mold D and a stop $d^5$ upon the half $d'$ of this mold.

E E' is the mold for forming the head. Each half of the mold is mounted upon a slide $e\ e'$, fixed in a socket $e^2$. This socket is able to turn and rise in a cylindrical support $e^3$, connected to the pillar $c^5$. The heading-mold E E' is provided with levers $e^4$ and $e^5$, each having a fork $e^6$ and $e^7$, which embraces the axes $e^8$ and $e^9$, carried by the heading-mold. The bottom parts of these levers carry rollers $e^{10}$ and $e^{11}$. The lower part of this socket $e^2$ is provided with a driving-sleeve $e^{12}$, having a spring $e^{13}$. In the socket is a grease-box $e^{14}$, carrying wicks $e^{15}$ and $e^{16}$, the object of which will be hereinafter explained.

Figure 6:
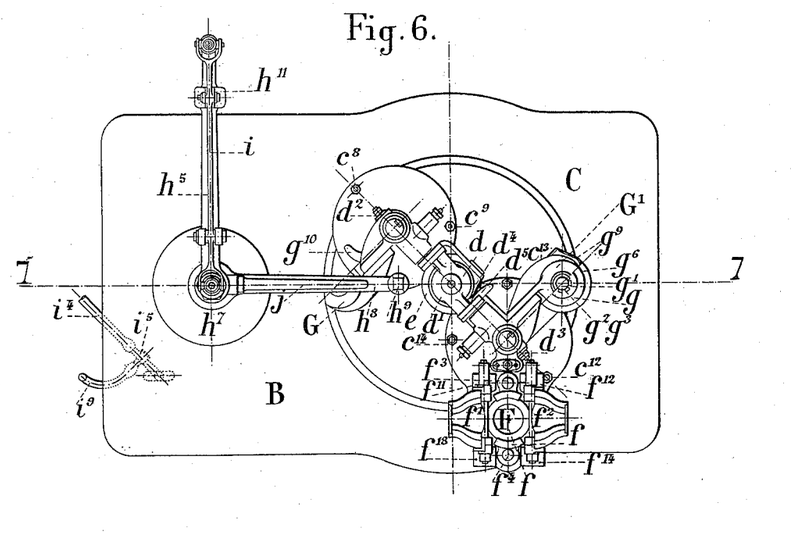
Fig. 6 is a plan of the top of the machine.
Figure 7:
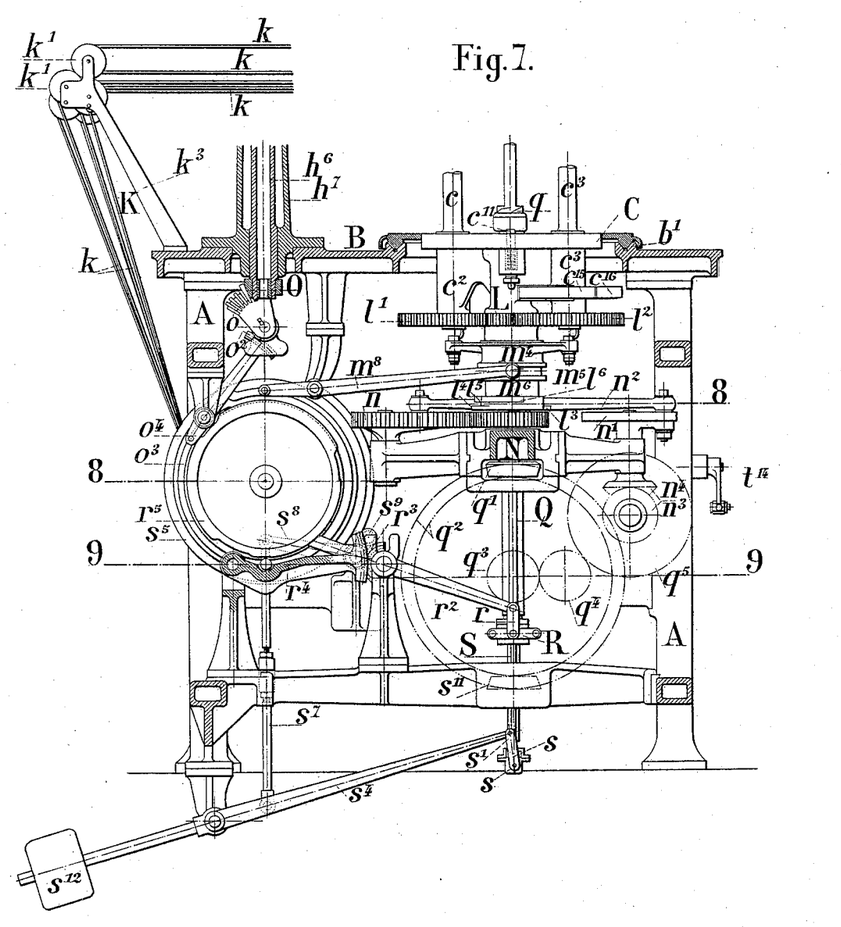
Fig. 7 is a section on the line 7 7 of Fig. 6.
Figure 13:
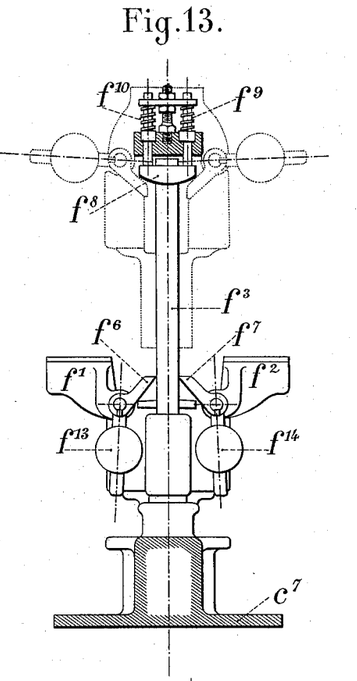
Fig. 13 is a section of the same on the line 13 13 of Fig. 12.

F is the parison-mold and is composed of a bottom $f$ and two shoulders $f'$ and $f^2$. These three parts are coated on the inside with retort-carbon. The parison-mold moves vertically and is guided by two pillars $f^3$ and $f^4$, mounted upon a support $f^5$, attached to the pillar $c^5$. When the mold is at its lower position, as in Fig. 13, the two shoulders are open. During the upward movement of the mold two catches $f^6$ and $f^7$, fastened to the shoulders $f'$ and $f^2$, strike against the stop $f^8$, fixed upon the pillar $c^5$, thereby forcing the shoulders to close. This stop is provided with two springs $f^9$ and $f^{10}$ in such a manner that the parison-mold F may be further raised after the shoulders have been closed. The dotted lines in Fig. 13 indicate the shoulders $f'$ and $f^2$ in their closed position, the open position being indicated in the same figure by full lines. At the commencement of the descending movement the moment the catches $f^6$ and $f^7$ leave the stop $f^8$ the four counterweights $f^{11}, f^{12}, f^{13}$, and $f^{14}$, (illustrated in Fig. 6,) which are fixed to the shoulders, bring these latter back to their open position. A sleeve $f^{15}$, loose upon the axis $f^{16}$, is mounted below the mold F.

The finishing-mold is formed of two halves G and G'. The half G is fixed to the pillar $c^4$ and the half G' to the pillar $c^5$.

Figure 15:
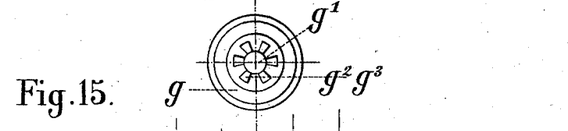
Fig. 15 is a plan of the bottom of the finishing-mold.
Figure 16:
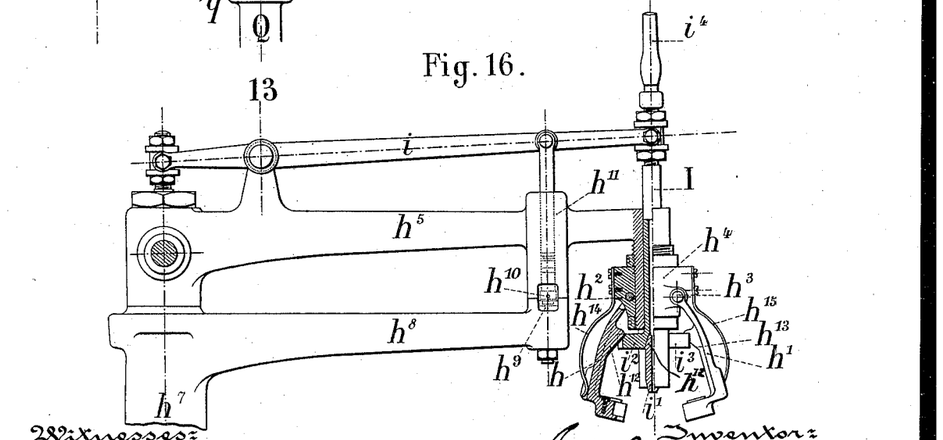
Fig. 16 is an elevation, partly in section, of the tongs for holding the bottle during manufacture.

$g$ is the bottom of the mold, and $g'$ is the punch which serves to form the push of the bottle. The bottom $g$ of the mold carries at its lower end a series of grooves $g^2$, as illustrated in Fig. 15, through which pass the feathers $g^3$ of the punch $g'$. Two of the feathers $g^3$ are longer than the others and serve as guides for the punch. These longer feathers $g^3$ rest upon an internal projection $g^4$ on the socket $g^5$ when the punch is in its lower position. The bottom $g$ of the mold is mounted upon this socket $g^5$, which rotates and is vertically movable in a cylindrical support $g^6$, carried by the pillar $c^4$. The lower portion of the socket $g^5$ carries a sleeve $g^7$, which gives a progressive rotary motion to the bottom of the mold by means of a spiral spring $g^8$. A buffer-spring $g^9$ is fixed upon the half G' of the mold. A stop $g^{10}$ is fixed upon the pillar $c^4$. The spring $g^9$ is intended to deaden the blow at the moment of closing the mold.

Figure 5:
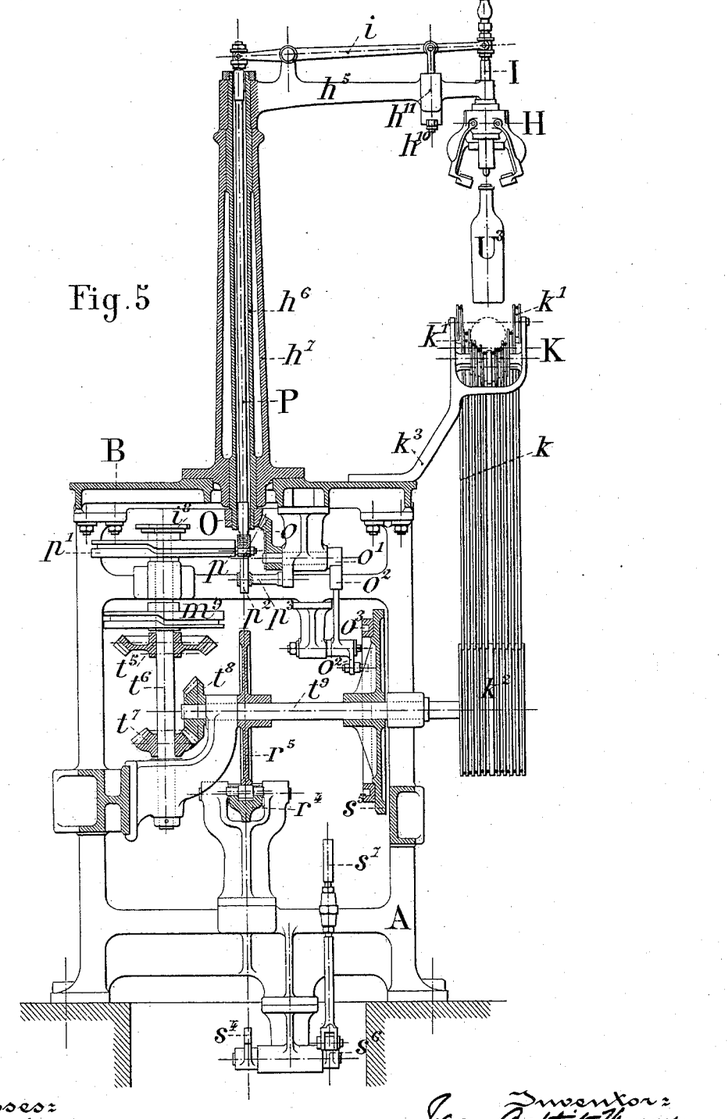
Fig. 5 is a vertical section on the line 5 5 of Fig. 1.
Figure 17:
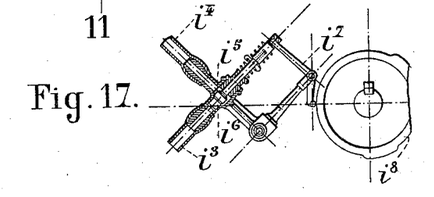
Fig. 17 is a plan of the arrangement for blowing.

H are the tongs, which are composed of two branches $h$ and $h'$, jointed upon the two axes $h^2$ and $h^3$, carried by the head $h^4$, which head is fixed to the support $h^5$, keyed to the upper end of the hollow shaft $h^6$, as illustrated in Fig. 5. The shaft $h^6$ turns in the interior of the pillar $h^7$, fixed to the table B. The pillar $h^7$ carries a fixed arm $h^8$, provided at its end with a notch $h^9$, in which engages a stop-finger $h^{10}$, sliding in a recess $h^{11}$ on the support $h^5$. The stop-finger $h^{10}$ is fixed to a lever actuating the blowing-tube, hereinafter described. The two branches $h$ and $h'$ have upon them two inclined planes $h^{12}$ and $h^{13}$, which serve to separate the branches for opening the tongs. Two springs $h^{14}$ and $h^{15}$ serve to close the tongs. The blowing-tube I is fixed to the lever $i$, jointed upon the support $h^5$, and slides in a recess on this support. The lower portion of the tube I carries a twyer $i'$ and two wings $i^2$ and $i^3$, which serve to push back the inclined planes $h^{12}$ and $h^{13}$ to thereby open the tongs H. At the top of the tube I is placed a rubber tube $i^4$, which connects it to the blowing-box $i^5$, Fig. 17, fixed upon the table B. In the box $i^5$ is a valve $i^6$, adapted to be opened by the lever $i^7$ through the operation of the cam $i^8$. The box $i^5$ is connected by a rubber tube $i^9$ to a fan or its equivalent.

J is a funnel mounted upon an arm $j$, fixed to the support $h^5$. This funnel serves to facilitate the introduction of the glass into the casting-mold D.

K is the conveyer. It is composed of a series of cords $k$, of asbestos or other incombustible material, which pass over the pulleys $k'$ or over a working drum $k^2$. These pulleys $k'$ and cords $k$ are arranged to form a trough-like receptacle, into which the body of the bottle fits, as shown by dotted lines in Fig. 5. Other pulleys and a tension apparatus (not shown in the drawings) complete the conveyer. The conveyer K is fixed to the table B by means of the fixed arm $k^3$.

Figure 8:
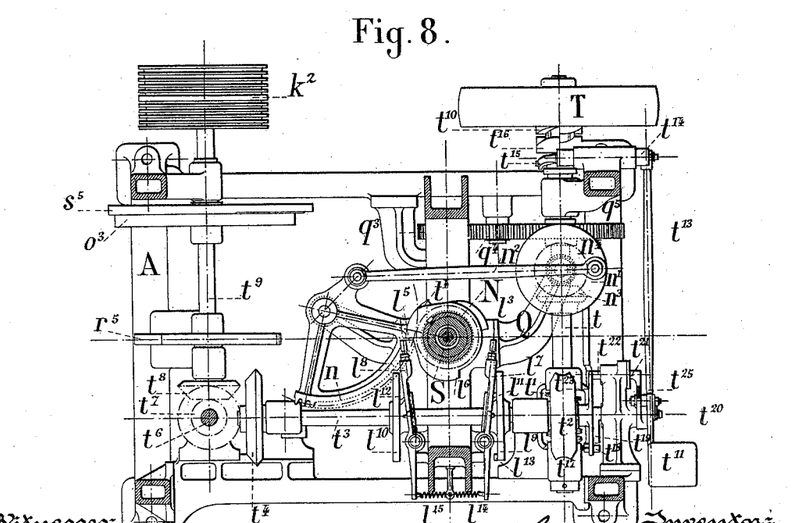
Fig. 8 is a section on the line 8 8 of Fig. 7.
Figure 9:
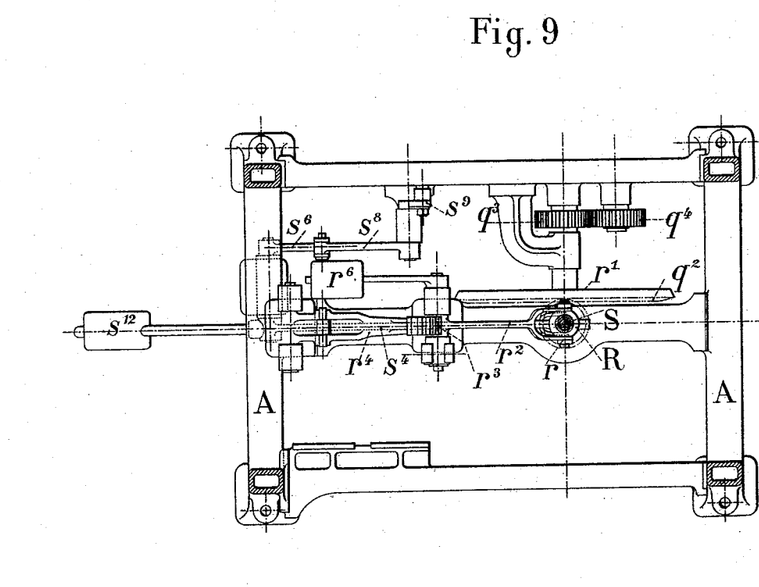
Figure 10:
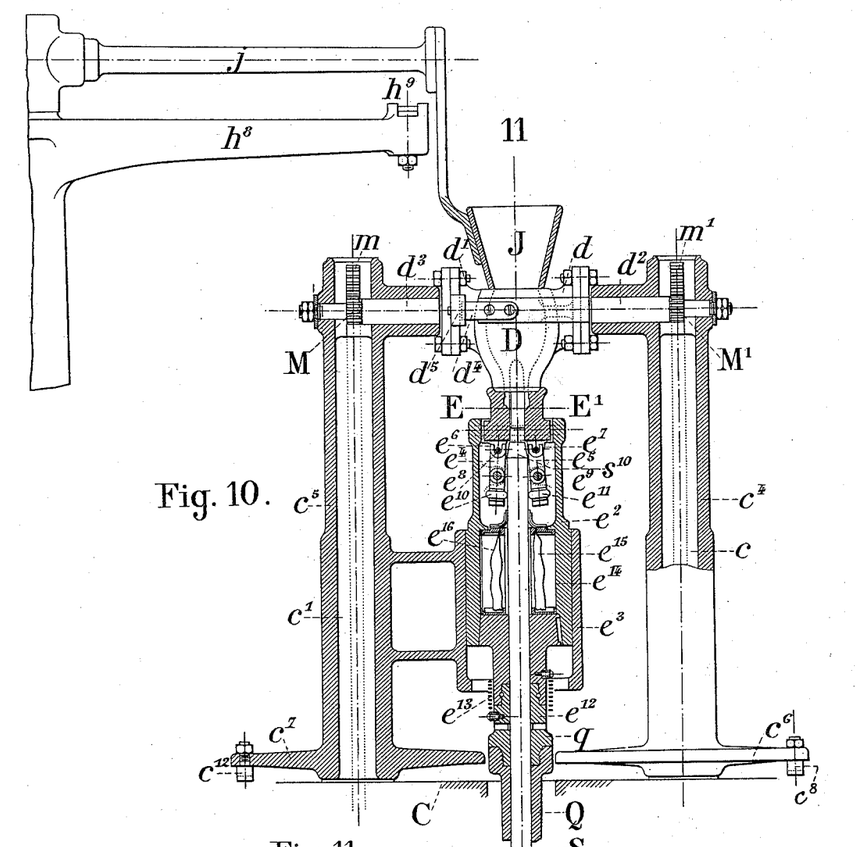
Fig. 10 is a vertical axial section showing the casting-mold, the heading-mold, the pillars carrying the molds, the funnel, and the grease-box.
Figure 11:
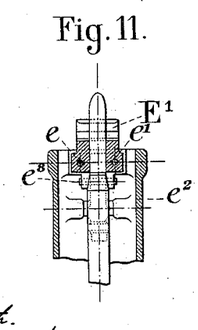
Fig. 11 is a part section of the heading-mold on the line 11 11 of Fig. 10.

The arrangement for substituting one mold for another consists of a pinion L, rotating idly upon the shaft $l$, which is fixed centrally under the plate C. This pinion L actuates two toothed cones $l'$ and $l^2$, keyed upon the lateral axes $c$ and $c'$. The lower portion of the pinion L carries four tappets $l^3, l^4, l^5$, and $l^6$. Two levers $l^7$ and $l^8$, provided with projections, successively engage with these tappets to stop the rotation of the pinion L. These levers are actuated by two disks $l^9$ and $l^{10}$, carrying bosses $l^{11}$, $l^{12}$, and $l^{13}$, which push back the projections on the levers $l^7$ and $l^8$. Springs $l^{14}$ and $l^{15}$ serve to bring these levers back into the position shown in Fig. 8. The casting-mold D is inverted by means of the pinions M and M', keyed upon the axes $d^2$ and $d^3$ of the mold D. These pinions are actuated by means of racks $m$ and $m'$, guided in grooves in the axes $c$ and $c'$. At the bottom of each rack is a bearing $m^2$ for the rack $m$ and $m^3$ for the rack $m'$. These bearings are in prolongation of the axes $c$ and $c'$. They rotate in a two-armed head $m^4$, mounted idly upon the lower portion of the pinion L. In the lower part of the head $m^4$ is a groove $m^5$, in which engage the bosses $m^6$ and $m^7$ of the lever $m^8$. This lever is actuated by the cam $m^9$.

In order to give alternate rotary motion to the plate C, the latter is provided at its center, as above described, with a shaft $l$, the lower portion of which carries a toothed wheel N, keyed upon it. This wheel is actuated by a toothed sector $n$, connected to a disk $n'$ by means of a connecting-rod $n^2$. Motion is obtained by means of bevel-pinions $n^3$ and $n^4$, mounted in the framing of the machine. The continuous rotary movement of the plate $n'$ gives to the sector $n$ a to-and-fro motion by means of the connecting-rod $n^2$.

At the lower part of the hollow shaft $h^6$ is keyed a bevel-pinion O, actuated by a toothed sector $o$, which is itself actuated by the two spur-sectors $o'$ and $o^2$. These sectors $o'$ and $o^2$ are actuated by the cam $o^3$ by means of the lever $o^4$. These parts serve to turn the tongs H.

To raise and lower the blowing-tube I, a rod P is employed, connected at its upper end to one end of the lever $i$. The lower end of the rod P carries an arm $p$, which engages in a groove in the cam $p'$. The lower end of the rod P has a square piece $p^2$, which slides in the arm $p^3$ in order that the cam $p'$ may not draw the rod P with it in its rotary movement.

The arrangement for rotating the heading-mold, the bottom of the finishing-mold, and the central rod which forms the neck of the bottle consists of a central tube Q, which slides in the interior of the hollow shaft $l$. The tube Q is provided at its lower portion with a driving-sleeve $q$, engaging either with the sleeve $e^{12}$, driving the heading-mold, or with the sleeve $g^7$, driving the bottom of the mold $g$, in order to communicate to them its rotary movement. The rotary movement of the sleeve $q$ is obtained by means of a pinion $q'$, keyed upon the tube Q in such a manner as to permit the tube to slide in the pinion. This pinion $q'$ is actuated by a bevel-wheel $q^2$, driven by the pinions $q^3$, $q^4$, and $q^5$.

To alternately raise the heading-mold, the parison-mold, and the bottom of the finishing-mold, the tube Q carries at its lower portion a collar R, suspended by the small rods $r$ and $r'$, pivoted to the end of the lever $r^2$. This lever, which is mounted upon a suitable support, carries at its other end a toothed sector $r^3$, actuated by means of another lever $r^4$ by the cam $r^5$. Upon the lever $r^2$ is fixed a counterweight $r^6$.

S is the central rod for forming the neck, for pushing the punch, and for closing the heading-mold. This rod is located inside the tube Q and is provided at its lower portion with a bearing $s$, held by two small connecting-rods $s'$ and $s^2$. The bearing $s$ has a cap $s^3$ for lowering the rod S. The connecting-rods $s'$ and $s^2$ are pivoted upon the lever $s^4$, which is actuated by the cam $s^5$ through the instrumentality of a lever $s^6$, a connecting-rod $s^7$, a lever $s^8$, and the roller-lever $s^9$.

$S^{10}$ is a cone fixed upon the rod S and serves to elevate the levers $e^4$ and $e^5$ and to thereby close the two parts E and E' of the heading-mold. The rod S is rotated in a reverse direction to the tube Q by means of the pinion $s^{11}$, keyed upon the rod S and actuated by the bevel-wheel $q^2$.

$s^{12}$ is a counterweight mounted upon the lever $s^4$.

T is the driving-pulley of the machine, actuated by any type of motor. (Not shown in the drawings.) This pulley T is mounted upon the horizontal shaft $t$, which carries at its end a worm $t'$. This shaft $t$ also carries the pinion $q^5$ and the bevel-wheel $n^3$. The worm $t'$ transmits its motion to the worm-wheel $t^2$, keyed upon the horizontal shaft $t^3$. This shaft carries small disks $l^9$ and $l^{10}$. The shaft $t^3$ also carries at one end a bevel-wheel $t^4$, which drives the pinion $t^5$ of the vertical shaft $t^6$. The shaft $t^6$ carries at its upper end the cams $m^9$, $p'$, and $i^8$. At its lower end is keyed the pinion $t^7$, which drives the horizontal shaft $t^9$ by means of the bevel-wheel $t^8$. Upon the shaft $t^9$ are mounted the cams $r^5$, $s^5$, and $o^3$ and the drum $k^2$. The three shafts $t^3$, $t^6$, and $t^9$ make but one revolution during the manufacture of a bottle. The pulley T, which rotates idly upon the shaft $t$, carries a driving-wheel $t^{10}$. A treadle $t^{11}$ serves to drive the machine through the instrumentality of the lever $t^{12}$, connecting-rod $t^{13}$, lever $t^{14}$, and forked lever $t^{15}$. The lever $t^{15}$ actuates the sleeve $t^{16}$, keyed to the shaft $t$. In order to automatically disengage the machine, a lever $t^7$ is keyed upon the horizontal shaft $t^3$ and carries a projection $t^{18}$, which at each rotation of the shaft $t^3$ lifts a disengaging-finger $t^{19}$, fixed on the axis $t^{20}$ of the lever $t^{12}$. The machine is arrested by means of an inclined plane $t^{21}$, carried by the lever $t^{12}$, which pushes a stop $t^{22}$, against which rests the lever $t^{23}$, fixed to the lever $t^{17}$. On the machine being put into operation the inclined plane $t^{21}$ leaves the stop-finger $t^{22}$, which is controlled by a spring, (not shown in the drawings,) and so disengages itself from the lever $t^{23}$. The counterweight $t^{24}$ assures stability of the arrangement in either position. The hand-lever $t^{25}$ serves, if required, to disengage the machine.

U' is the mass of glass blown in the closed parison-mold, $U^2$ is the mass of glass in the parison finished, and $U^3$ is the finished bottle.

In order to understand the action of this machine, its operation will be briefly described.

Figure 1:
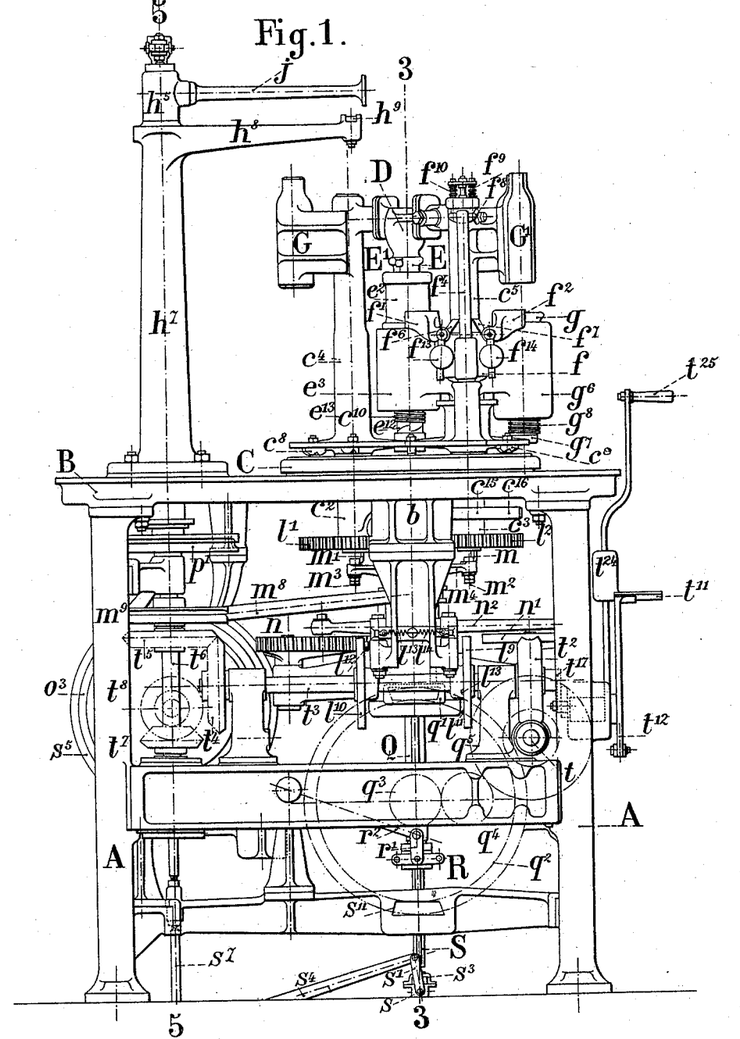
Figure 1 is a front elevation of the machine embodying main features of my invention.
Figure 2:
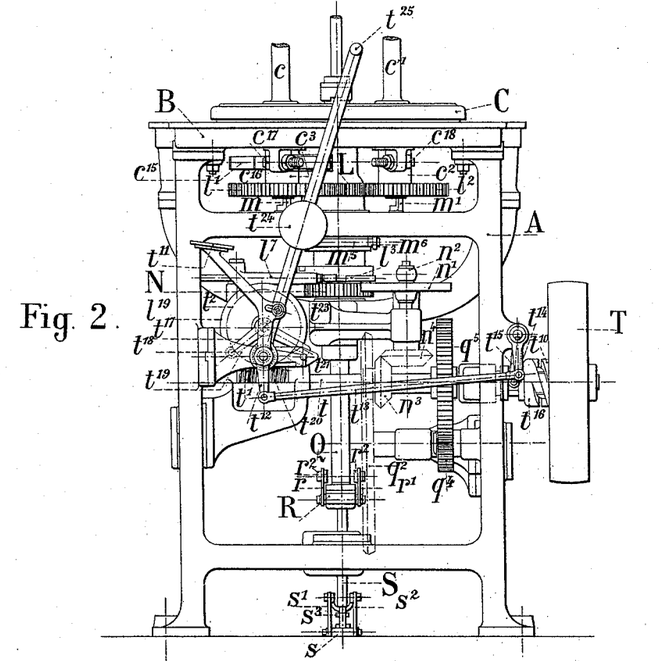
Fig. 2 is a side elevation of the machine.
Figure 3:
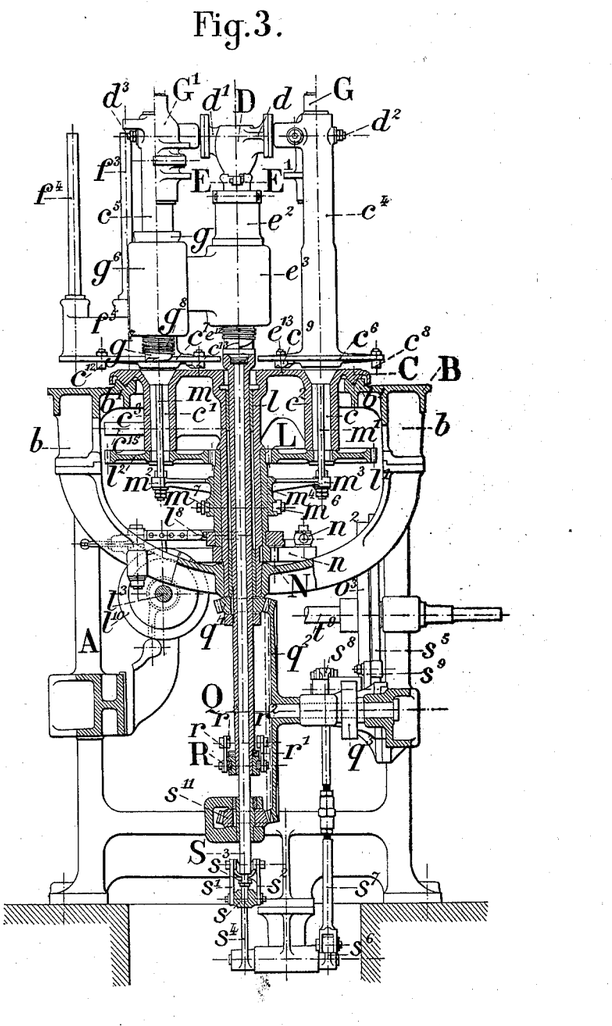
Fig. 3 is a vertical section on the line 3 3 of Fig. 1.
Figure 4:
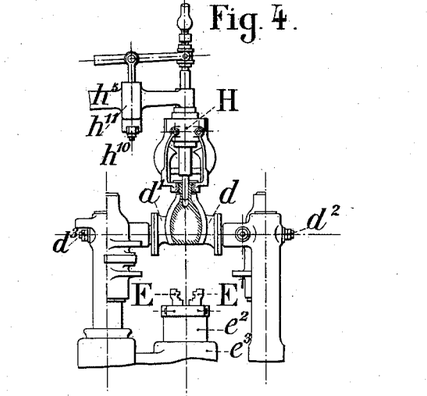
Fig. 4 shows the upper portion of Fig. 3, the casting-mold being in its inverted position and the tongs having seized the neck of the bottle.
Figure 12:
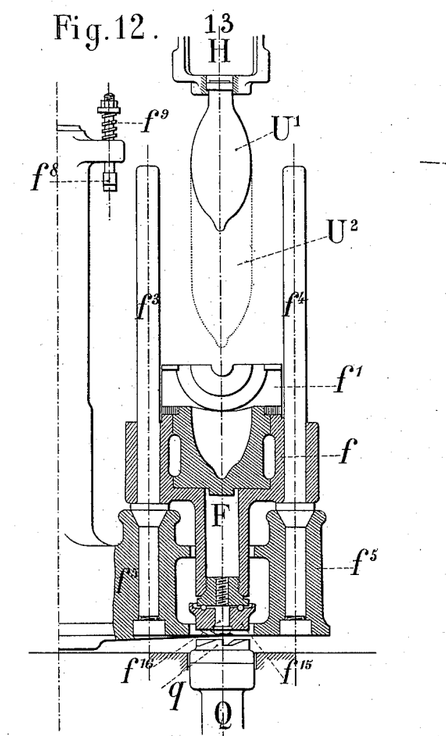
Fig. 12 is a vertical axial section of the parison-mold.
Figure 14:
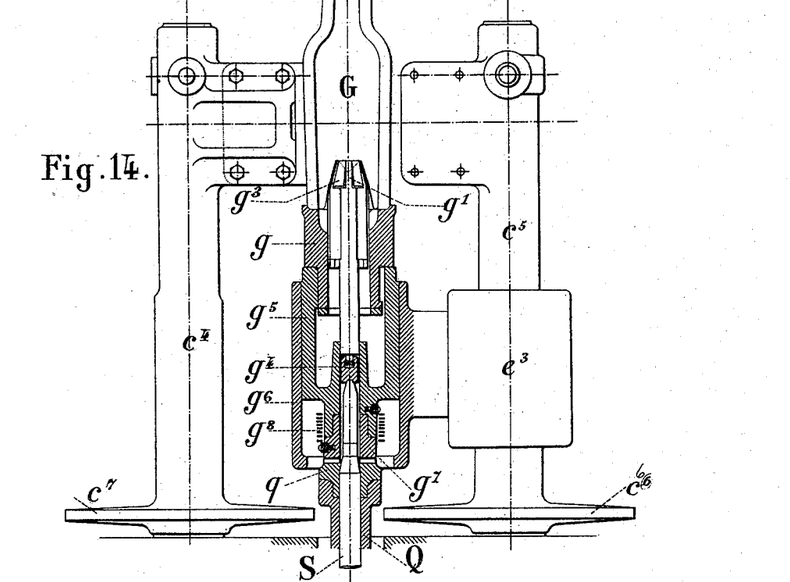
Fig. 14 is a vertical axial section of the finishing-mold.

At the commencement of the operation the casting-mold D and its funnel J are in the center of the machine. The parts of the molds E and E' are placed in their closed position against the bottom of the mold D, as shown in Fig. 3, the driving-sleeve $q$ being in a position for driving the sleeve $e^{12}$ and the rod S for forming the neck-hole penetrating slightly into the mold D. When the machine is set in motion, the central tube Q and the central rod S rotate in opposite directions, the plate C, taking with it the molds, turns in alternate directions for three-quarters of a circle, and thereafter the shafts $t^3$, $t^6$, and $t^9$ are rotated with reduced speed by means of the endless worm $t'$, and these movements will continue the whole time the bottle is being made, the several cams successively acting. This action, combined with the alternate rotary movements of the plate C and with the rotation of the tube Q and the rod S, will produce the following operations in the order described: The workman in pouring the glass into the funnel J presses upon the treadle $t^{11}$. This movement engages the driving-pulley T and the machine is started. The heading-mold E E' then rotates, being impelled by the tube Q, while the rod S, rotating in the opposite direction, commences the neck-hole. The cam $o^3$ withdraws the funnel J from the center of the machine, and the cam $S^5$ raises the rod S into the mass of glass for the purpose of completing the neck-hole. When the head is completed, the cam $s^5$ allows the rod S to descend, the rollers $e^{10}$ and $e^{11}$ no longer being maintained by the conical portion $s^{10}$ of the rod S. The wicks $e^{15}$ and $e^{16}$ rub the upper part of the rod S, which is oiled by the following operation: Centrifugal force moves the parts of the heading-mold E E' apart and the head of the bottle is disengaged. The cam $r^5$ then allows the tube Q to descend and the whole of the heading-mold falls by gravity upon the cylindrical support $e^3$. The cam $m^9$ inverts the mold D, which places the neck upward, as shown in Fig. 4. The cam $o^3$ brings the tongs H to the center of the machine and the centering-finger $h^{10}$ drops into its stop-tooth $h^9$. The cam $p'$ closes the tongs H, which seize the head of the bottle, while the twyer $i'$ of the tube I penetrates into the neck. The lever $l^7$ stops the tappet $l^3$, and the pillars $c^4$ and $c^5$, carrying the molds, rotate on their axes, opening the casting-mold D and bringing the parison-mold F to the center of the plate C, underneath the mass of glass suspended by the tongs H, as shown in Fig. 12. The cam $r^5$ lifts the tube Q and the parison-mold F. The stop $f^8$ arrests the catches $f^6$ and $f^7$, causing the shoulders $f'$ and $f^2$ of the mold F to close upon the mass of glass, as shown in dotted lines in Fig. 13 of the drawings. The cam $i^8$ lifts the blowing-valve $i^6$ and the pressure of air forces the glass against the walls of the mold F to shape it. The cam $r^5$ allows the tube Q to fall, and consequently the mold F, the shoulders $f'$ and $f^2$ of which open by the action of the counterweights $f^{11}$, $f^{12}$, $f^{13}$, and $f^{14}$. The mass of glass follows the descending movement of the mold F and is elongated until the moment at which the cam $i^8$ closes the valve $i^6$ of the blowing-box $i^5$ and stops the blowing. The lever $l^7$ arrests the tappet $l^4$, and the mold-supporting pillars $c^4$ and $c^5$ rotate upon their axes, carrying away with them the mold F and the finishing-mold G G', close upon the parison-mold, as illustrated in Fig. 14. The cam $r^5$ causes the tube Q to again rise, thereby lifting and rotating the mold-bottom $g$. The cam $i^8$ lifts the blowing-valve $i^6$, and the pressure of air forces the glass against the walls of the finishing-mold G G', and the cam $p'$ causes the blowing-tube I to be slightly raised in order to disengage the neck of the bottle, but without bringing the twyer $l'$ completely out of the neck and without opening the tongs H. The cam $i^8$ stops the blowing and the cam $s^5$ raises the rod S, which pushes the punch $g'$ for making the push of the bottle and thus allows the punch to fall. The cam $r^5$ allows the tube Q to fall and gravity causes the mold-bottom $g$ to descend upon the cylindrical support $g^6$. The cam $p'$ disengages the centering-finger $h^{10}$ from its stop-tooth $h^9$. The lever $l^8$ arrests the tappet $l^6$, and then the tappet $l^5$. The mold-supporting pillars $c^4$ and $c^5$ rotate on their axes, taking with them the finishing-mold G G' and bringing the casting-mold D back to the center of the machine with the neck uppermost. Shortly afterward the lever $l^8$ arrests the tappet $l^6$ and the cam $o^3$ draws the tongs H back from the center of the machine and carries the finished bottle above the conveyer K, as illustrated in Fig. 5. The next to the last rotation of the driving-pulley T serves, first, to bring all parts of the machine back to the position required to commence the next operation, the cam $m^9$ returns the casting-mold D, the cam $o^3$ brings the funnel J back above the mold D, the cam $s^5$ raises the rod S, and the cam $r^5$ raises the mold E E', which arrives in a closed position below the mold D, and, second, to open the tongs H, which allows the bottle to pass away upon the conveyer K. The last turn of the driving-pulley T causes the machine to be disengaged, as has been above described.

Figure 18:
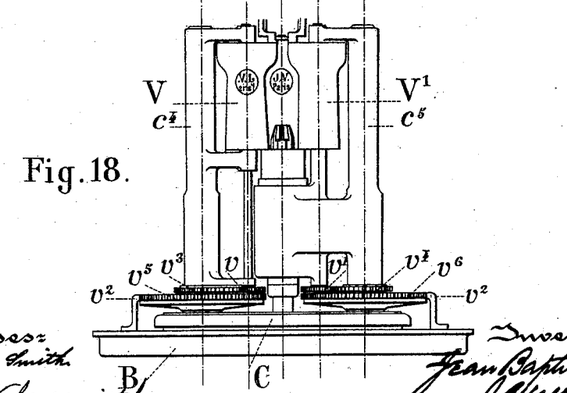
Fig. 18 shows a modification of the machine.

In Fig. 18 is shown a modified arrangement, which consists in replacing the casting-mold D by the dies V and V', actuated by the parts to be described. The die V is mounted laterally upon the mold-carrying pillar $c^4$, and the die V' upon the pillar $c^5$. These dies carry below a toothed wheel $v$ for the die V and a toothed wheel $v'$ for the die V'. The toothed wheels $v$ and $v'$ are driven by an inwardlytoothed crown $v^2$, mounted centrally upon the table B by means of pinions $v^3$ and $v^4$, idle upon the pillars $c^4$ and $c^5$ and coupled to the toothed wheels $v^5$ and $v^6$. The dies V and V' rotate in the opposite directions at the rate of three-quarters of a revolution for each oscillation of the plate C. These dies may carry designs or inscriptions in intaglio or relief which reproduce in intaglio or relief on the bottle. The shape of the dies may be varied, as desired, for making any type of bottle. If desired, the inscriptions or designs may be inked to reproduce them in color upon the bottle. Similarly the parison-mold may be replaced by dies provided with suitable actuating mechanism. It is to be understood that the molds and dies may be made of any suitable material. The molds and dies may, if desired, be given a continuous rotary motion instead of the alternate movement above described. To make bottles with a flat bottom, the bottom of the finishing-mold should be suitably modified.

Having thus described the nature and objects of my invention, what I claim as new, and desire to secure by Letters Patent, is—

1. In a machine of the character described, a casting-mold comprising two half-molds each mounted upon an axis, means for rotating each axis and half-mold in an alternate manner to close and open the casting-mold, a second axis for each half-mold at right angles to the first axis, and means for inverting the half-molds upon their second axis, substantially as and for the purposes described.

2. In a machine of the character described, a heading-mold comprising two separable portions, a sleeve to which the lower end of each portion of the heading-mold is pivoted, two weighted levers adapted when elevated to move the portions of the mold upon their pivots to close the upper end of the heading-mold, and a rotating central tube adapted when raised to impart rotary movement to the sleeve and to cause the levers to be elevated, said weighted levers adapted to normally assume a vertical position when not elevated and the portions of the mold adapted to rotate with the sleeve and to separate under centrifugal force when the levers are in vertical position, substantially as and for the purposes described.

3. In a machine of the character described, a parison-mold consisting of a bottom and two normally open shoulder portions, a rotating central tube, means for elevating said central tube into contact with the bottom of the parison-mold, whereby the parison-mold is first elevated and then rotated, and means for closing the shoulder portions of the mold when in its elevated position and prior to its rotation, substantially as and for the purposes described.

4. In a machine of the character described, a finishing-mold consisting of two symmetrical halves and a movable bottom, said halves each having an axis, means for alternately rotating the axis of each half to close and open said halves, and means for elevating and rotating the bottom of the mold when the halves are in closed position, substantially as and for the purposes described.

5. In a machine of the character described, a finishing-mold comprising two symmetrical halves and a perforated movable bottom, means for rotating each half in alternate directions to close and open the same, means for elevating and rotating the movable bottom when the halves are closed, and a punch adapted to be elevated through the perforations in the movable bottom and to rotate with said bottom, substantially as and for the purposes described.

6. In a machine of the character described, tongs having two branches, a support to which said branches are pivoted, means for opening and closing said branches, and means for turning said support and branches, substantially as and for the purposes described.

7. In a machine of the character described, a blowing apparatus comprising a box or chamber having an inlet and outlet, a spring-controlled valve normally closing the inlet to said pipe, a lever-arm adapted to open said valve, means for operating said arm, a pipe connecting the inlet of the box with a suitable source of air-supply, and a pipe connecting the outlet of said box with the blowing-tube, substantially as and for the purposes described.

8. In a machine of the character described, a conveyer comprising a series of cords of asbestos or suitable fireproof material and a series of pulleys over which the cords are adapted to travel, said pulleys and cords being so arranged as to form a trough-like receptacle for the bottle, substantially as and for the purposes described.

9. In a machine of the character described, a plate carrying a casting-mold, a head-forming mold, a parison-mold and a finishing-mold, a pinion carried by said plate, a sector meshing with said pinion, a circular disk, means for revolving said disk, and a rod connecting said disk with said sector, whereby alternate rotary motion may be imparted to the plate, substantially as and for the purposes described.

10. In a machine of the character described, a series of molds for performing the successive operations of the machine in combination with mechanism for bringing successive molds into operative position, said mechanism comprising a plate upon which the molds are mounted, a series of axes carrying the molds, a central pinion fixed to the plate, two wheels fixed to the mold-carrying axes and meshing with the central pinion, means for rotating said pinion, two levers, and operating mechanism for said levers to cause the same to successively arrest the movement of the central pinion, substantially as and for the purposes described.

11. In a machine of the character described, in combination with a head-forming mold, of a centrally-arranged neck-forming rod adapted to enter said mold and to close the same, and means for raising, lowering and rotating said rod, substantially as and for the purposes described.

12. In a machine of the character described, a central tube and means for rotating and for raising and lowering the same, in combination with a heading-mold, a finishing-mold having a rotatable bottom, and means for bringing said molds successively in alinement with the central tube, whereby upon the elevation of said tube, the heading-mold will be elevated to close the same and then rotated, and the movable bottom of the finishing-mold will be elevated and rotated, substantially as and for the purposes described.

In testimony whereof I affix my signature in presence of two witnesses.

JEAN BAPTISTE VERNAY.

Witnesses:
   G. DE MESTSOF,
   EDWARD P. MACLEAN.